United States Patent Office 3,729,498

Patented Apr. 24, 1973

3,729,498

PROCESS FOR THE PREPARATION OF ORGANIC DINITRILES

Yoshiyasu Masada and Teruo Yasui, Kurashiki, Japan, assignors to Kurashiki Rayon Co., Ltd., Okayama Prefecture, Japan No Drawing. Filed Sept. 24, 1969, Ser. No. 860,828
Claims priority, application Japan, Sept. 27, 1968, 43/70,314, 43/70,316; Oct. 26, 1968, 43/78,137; Nov. 2, 1968, 43/80,127; Dec. 4, 1968, 43/88,882; Feb. 6, 1969, 44/8,894; June 27, 1969, 44/51,246
Int. Cl. C07c *121/20, 121/26*
U.S. Cl. 260—465.8 D 16 Claims

ABSTRACT OF THE DISCLOSURE

Organic dinitriles are prepared in high yield with high content of 1,4-isomers by vapor phase dimerization of acrylonitrile in the presence of a novel ruthenium-containing catalyst comprising, as the first component, a member of the group consisting of metal ruthenium and ruthenium compounds, and as the second component, a member of the group consisting of metal bismuth, bismuth compounds, antimony compounds, elementary arsenic, arsenic compounds, and phosphorus compounds.

This invention relates to a process for the preparation of organic dinitriles from acrylonitrile. More particularly, the invention relates to vapor phase preparation of organic dinitriles, by vapor phase dimerization of acrylonitrile in the presence of novel ruthenium-containing catalyst.

As a method for preparing organic dinitriles by dimerization of acrylonitrile, reductive dimerization of acrylonitrile by an electrochemical process is well known, but this method is objectionably expensive. Recently, catalytic processes employing various catalysts have been proposed, but in all of these processes the reaction is performed in the liquid phase.

The present invention relates to a novel process for preparing organic dinitriles by the vapor phase dimerization of acrylonitrile, such process having many advantages such as higher conversion compared with known liquid phase processes, easier separation and recovery of the reaction product, and better adaptability for continuous and larger scale operation. None of the above advantages can be expected of liquid phase processes. Furthermore, selectivity for dinitrile formation is higher in the subject process when compared with known liquid phase processes.

A process for the vapor phase dimerization of acrylonitrile was previously proposed, in the presence of a catalyst composed either solely of metal ruthenium or a ruthenium compound, or of a mixture of the foregoing with another component. However, in such a process the yield of dinitriles is not satisfactorily high. Particularly the selectivity for 1,4-isomers (i.e., 1,4-dicyanobutene, adiponitrile) which are useful as the starting materials of polymers is unsatisfactory.

The process of the present invention is an improvement of the above vapor phase dimerization of acrylonitrile involving a novel ruthenium-containing catalyst composition.

According to the present invention, a process for the preparation of organic dinitriles is provided, which comprises contacting acrylonitrile with hydrogen in the vapor phase, at temperatures ranging from 100 to 450° C., under a total pressure (absolute pressure) of 1–20 atmospheres, in the presence of a catalyst system comprising as the first component, a member selected from the group consisting of ruthenium metal and ruthenium compounds and, as the second component, a member selected from the group consisting of bismuth metal, bismuth compounds, antimony compounds, elementary arsenic, arsenic compounds, and phosphorus compounds.

Thus, the catalyst employed in the subject process contains, as the first component, ruthenium metal or a ruthenium compound. The ruthenium compounds include such inorganic ruthenium compounds such as ruthenium chlorides ($RuCl_2$, $RuCl_3$, $RuCl_4$), ruthenium hydroxide ($Ru(OH)_3$), ruthenium nitrate ($Ru(NO_3)_3$), ammonium hexachlororuthenate ($(NH_4)_2RuCl_6$), and ruthenium oxychloride ($Ru(OH)Cl_3$); organic ruthenium compounds such as ruthenium acetate ($Ru(OCOCH_3)_3$), and ruthenium triacetylacetonate ($Ru(CH_3COCH_2COOCH_3)_3$); and ruthenium complex compounds such as

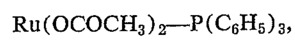

$Ru(OCOCH_3)_2—P(C_6H_5)_3$,

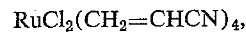

$RuCl_2(CH_2=CHCN)_4$,

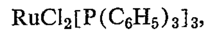

$RuCl_2[P(C_6H_5)_3]_3$,

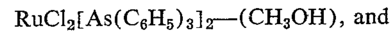

$RuCl_2[As(C_6H_5)_3]_2—(CH_3OH)$, and

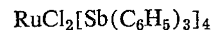

$RuCl_2[Sb(C_6H_5)_3]_4$

Among the foregoing, the particularly preferred first component is ruthenium trichloride ($RuCl_3$).

The second component of the catalyst employed in the invention is selected from the group consisting of bismuth metal, bismuth compounds, antimony compounds, elementary arsenic, arsenic compounds and phosphorous compounds.

The bismuth compounds include inorganic bismuth compounds such as halogenated bismuth ($BiCl_2$, $BiCl_3$, $BiBr_3$, $BiI_3$, etc.), bismuth oxychloride ($BiOCl$), and bismuth nitrate ($Bi(NO_3)_3.5H_2O$); and organic bismuth compounds of the general formula, $Bi(R_1R_2R_3)$, such as $Bi(C_6H_5)_3$, $Bi(C_3H_7)$, $(C_6H_5)_2$, $Bi(C_6H_{11})_3$, etc., in which $R_1$, $R_2$, and $R_3$ are same or different hydrocarbon groups such as ethyl, propyl, butyl, phenyl, cyclohexyl, etc.

Among the foregoing bismuth compounds, those preferred are the organic bismuth compounds of the general formula $Bi(R_1R_2R_3)$, inter alia, triphenyl bismuth.

The antimony compounds are the stibines expressed by a general formula $Sb(R_1R_2R_3)$, in which $R_1$, $R_2$, and $R_3$ are same or different hydrocarbon groups, such as ethyl, propyl, cyclohexyl, phenyl, and naphthyl. The most preferred stibine is triphenyl antimony.

The arsenic compounds includes inorganic arsenic compounds such as $AsCl_3$; and arsines of the general formula $As(R_1R_2R_3)$, in which $R_1$, $R_2$, and $R_3$ are same or different hydrocarbon groups such as ethyl, cyclohexyl, phenyl, naphthyl, etc., and oxygen-containing hydrocarbon groups such as methoxy and phenoxy.

The preferred arsenic compounds are the arsine of the general formula $As(R_1R_2R_3)$, inter alia, triphenyl arsenic.

The phosphorus compounds are the phosphines represented by the general formula $P(R_1R_2R_3)$, in which $R_1$, $R_2$, and $R_3$ are same or different hydrocarbon groups such as ethyl, propyl, phenyl, naphthyl, and cyclohexyl. For example, $P(C_6H_5)_3$, $P(C_6H_5)_2(C_{10}H_7)$, $P(C_3H_7)(C_6H_5)_2$, $P(C_6H_{11})_3$, $P(C_6H_{11})_2(C_6H_5)$, $P(C_2H_5)_3$, may be used, the most preferred being $P(C_6H_5)_3$.

Among the above-mentioned various second components of the catalyst, the most preferred are the bismuth compounds, particularly organic bismuth compounds of the general formula $Bi(R_1R_2R_3)$, inter alia, triphenyl bismuth.

In the catalyst employed for the present invention, the mixing ratio of the first and second components may be varied quite widely, but for achieving high catalytic activity the ratio of the first component/second component, when expressed in mol ratio, ranges from 1/0.5–1/10, preferably from 1/1 to 1/3.

Also the catalyst of the invention may contain, besides the present aforesaid first and second components, a member selected from the group consisting of palladium metal, palladium compounds, gold metal and gold compounds, as the third component.

As the palladium compound, for example, $PdCl_2$, $Pd(C_6H_5)_4$, $PdCl_2[P(C_6H_5)_3]_2$, $Pd(NO_3)_2$, $PdBr_2$,

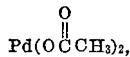

and other carboxylates can be used.

Examples of gold compounds include chloroauric acid; inorganic salts such as chloride, nitrate, and sulfate of gold; organic carboxylates such as acetate and propionate of gold; and organometallic compounds containing electron donative groups, such as acetyl acetonate of gold, $[As(C_6H_5)_3]_3AuCl$, $[Bi(C_6H_5)_3]_3AuBr$, $[Sb(C_5H_{11})_3]_3$, etc.

Use of such three-component type catalyst is found to be advantageous since the same increases conversion and consequently, increases dinitrile yield in the reaction product, and particularly selectively improves the yield of 1,4-dicyanobuten-1 which is the very useful product. Among the foregoing various third components, particularly preferred compounds are palladium chloride and chloroauric acid. The most preferred ternary catalyst system consists of ruthenium trichloride, triphenyl bismuth and palladium chloride. The amount of the third component ranges from 0.1–1 mol per mol of ruthenium, preferably 0.2–0.5 mol per mole of ruthenium.

The catalyst of the invention can be easily prepared by mixing the selected components in any conventionally practiced manner. The catalyst is preferably used in a form supported on a suitable carrier. As the carrier, active carbon, alumina, silica, diatomaceous earth, pumice, etc., can be used, alumina being particularly preferred. The surface area of the carrier normally ranges 1–500 $m.^2/g.$, preferably 10–200 $m.^2/g.$ The components of the catalyst can be deposited onto the carrier by dissolving or dispersing the first and second components, as well as the third component if used, in a suitable solvent, adding the carrier into the solution, and thereafter evaporating the solvent. As such solvent, for example, tetrahydrofuran, methanol, dioxane, and acetone can be used. In some cases water may also be used. All the components of the catalyst are not necessarily simultaneously deposited onto the carrier by a single procedure. They may be deposited by separate procedures in any optional order.

The weight ratio of the catalyst components to carrier normally ranges from 1–20 wt. percent based on the weight of the carrier, preferably 2–10 wt. percent.

The catalyst supported on a carrier as above can be used in the reaction of the present invention without modification. If it is treated with hydrogen ($H_2$) before actual use, it exhibits high catalytic activity from the very initial stage of the reaction, and little change in the activity level throughout the reaction. The hydrogen used for the treatment is not necessarily pure hydrogen. The hydrogen treatment is conducted at temperatures ranging from room temperature to 500° C., preferably from 100 to 400° C., in the vicinity of reaction temperature. The treating time varies depending on the treating temperature and types of the compounds deposited onto the carrier, etc., but preferably ranges from approximately 2 to 50 hours.

Fixed bed, fluidized bed, and moving bed systems can be employed for carrying out the dimerization reaction of acrylonitrile using the specified catalyst of the present invention. The mol ratio of hydrogen to acrylonitrile to be fed for practicing the reaction ranges from 1:0.1–1:10, preferably 1:0.5–1:1. Excessive hydrogen supply is objectionable, since it increases the yield of propionitrile, which is a side product. The gas to be supplied into the reaction system may contain an inert gas or gases which are not detrimental to the reaction, such as nitrogen, argon, etc. Presence of such inert gas contributes to inhibit the formation of propionitrile and improve the yield of 1,4-dicyanobuten-1, particularly when a ternary catalyst system is used. The reaction temperature ranges from 100–450° C., preferably 150–350° C. If it is too low, not only is the catalytic activity reduced, but also the dinitriles formed accumulate on the catalyst to cause decrease of the catalytic activity with time passage. Whereas, if the reaction temperature is too high, the dinitriles tend to be carbonized on the catalyst, which of course is objectionable.

The reaction can be performed under a total pressure ranging from 1 to 20 atmospheres, as absolute pressure, but excessively high pressure hinders the desorption of dinitriles formed from the surface of the catalyst, and causes gradual decrease in conversion. Therefore, in order to maintain a constant catalytic activity, moderate pressure is preferred. Thus, in terms of absolute pressure, a pressure of 1–3 atmospheres is most preferred.

The space velocity of vaporized acrylonitrile is preferably 100–2,000 volume/catalyst volume·hour. As the starting acrylonitrile, that of industrially acceptable purity is employed. Presence of propionitrile, water, saturated hydrocarbon, inert gas (carbon dioxide, nitrogen) etc. does not affect the reaction.

The dinitriles synthesized of the reaction are composed mainly of adiponitrile, 1,4-dicyanobuten-2, 1,4-dicyanobuten-1, 1,3-dicyanobuten-1, 1,3-dicyano-1-methyl-propane, methylglutaronitrile, etc. The reaction product contains, besides those dinitriles, such hydrogenation products as propionitrile and amine formed by the hydrogenation of the cyano groups of nitriles, etc. Propionitrile can be readily converted to acrylonitrile, by separate dehydrogenation.

The adiponitrile synthesized by the subject process is useful as a starting material of polymers, and 1,4-dicyanobuten can be easily converted to adiponitrile by hydrogenation.

The process of the invention will be explained in further details, with reference to the following working examples. Analysis of the components were performed by known gas chromatography.

EXAMPLE 1

2.1 grams of $RuCl_3$ and 3.1 g. of $BiCl_3$ were dissolved in 250 ml. of tetrahydrofuran, and 50 g. of alumina (surface area: 70 $m.^2/g.$) were added into the solution. Thus $RuCl_3$ and $BiCl_3$ were deposited onto the alumina in such a manner that the solvent was evaporated from the system on a hot water bath of 70° C. The catalyst system was then dried at 100° C., and treated with hydrogen at 200° C. for 2 hours, and further at 250° C. for 2 hours.

Five (5) cc. of the above catalyst were placed in a glass tube reactor of 15 mm. in inner diameter, and through which 1.5 liter/hour of vaporized acrylonitrile, 1 liter/hr. of hydrogen, and 1.5 liter/hour of nitrogen were passed at the reaction temperature of 225° C., to be reacted under atmospheric pressure. The reaction product was collected and analyzed. The acrylonitrile conversion was 10.1%, and the reaction product was composed mainly of 1,4-dicyanobutene, adiponitrile, 1,3-dicyanabutene, 1,3-dicyanobutane, 1,2-dicyanocyclobutane, and propionitrile. Also traces of decomposition products such as acetonitrile, prussic acid, ethylene, propylene, etc. were detected.

The selectivity (mol percent of the product based on the mol of reacted acrylonitrile) for each of the foregoing products was as follows: dimers—35%, 1,4-isomers—23%.

| Reaction product: | Selectivity (percent) |
|---|---|
| Propionitrile | 62 |
| Adiponitrile | 2 |
| 1,4-dicyanobutene | 21 |
| 1,2-dicyanocyclobutane | 3 |
| 1,3-dicyanobutene | 8 |
| 1,3-dicyanobutane | 1 |
| Acetonitrile | Trace |
| Prussic acid | Trace |
| Propylene | Trace |

EXAMPLE 2

4.1 grams of $Ru(CH_3COCH_2COCH_3)_3$ and 2.2 g. of $BiBr_3$ were added to 200 g. of acetone and stirred well. Fifty (50) g. of alumina (surface area: 70 m.$^2$/g.) were added to the system, and the foregoing catalytic components were deposited onto the alumina in such a manner that the acetone was evaporated under heating on a 65° C. bath. The catalyst system was treated with hydrogen at 150° C. for 3 hours, and further at 230° C. for 2 hours. Ten (10) cc. of the catalyst were placed in a glass tube reactor of 15 mm. in inner diameter, and through which 1.0 liter of vaporized acrylonitrile and 0.75 liter of hydrogen were passed per hour, to be reacted at 240° C. under atmospheric pressure.

The acrylonitrile conversion was 17.6%, dinitrile selectively was 55.0%, propionitrile selectivity was 40.7%, and 1,4-isomers selectivity was 35.7%. More than 90% of the 1,4-isomers was 1,4-dicyanobuten-1, the rest being adiponitrile.

EXAMPLES 3–9

0.15 gram of $RuCl_3$ and 0.96 g. of $Bi(C_6H_5)_3$ were dissolved in tetrahydrofuran. The mol ratio of Ru to Bi was 1 to 3. Five (5) g. of alumina (surface area: 100 m.$^2$/g.) were added to the solution, and $RuCl_3$ and $Bi(C_6H_5)_3$ were deposited onto the alumina in such a manner that the tetrahydrofuran was evaporated on steam bath, followed by drying and treatment in hydrogen current at 215° C. for 2 hours. On the prepared catalyst, 1.57 liter/hr. of vaporized acrylonitrile (corresponding to 4.6 cc./hr. of liquid acrylonitrile) and 1 liter/hr. of hydrogen gas were passed under atmospheric pressure, while the catalyst was maintained at 230° C. The reaction product collected in a bottle was analyzed by means of a gas chromatography employing 3-m. long column packed with Silicon DC500, with helium as the carrier gas. The confirmed acrylonitrile conversion was 16.7%, and selectivity for dinitrile formation was 30%, the content of 1,4-isomers in the dinitriles being 92.5%. The selectivity for propionitrile which is a hydrogenation product was 65%. (The foregoing results are presented as those of Example 5.)

The foregoing procedures were repeated except that the amount of $Bi(C_6H_5)_3$ was varied in each run while 0.15 g. of $RuCl_3$ was unchanged, thus varying the Ru/Bi mol ratio as indicated in Table 1 below. The results are also given in Table 1.

TABLE 1

| Example number | Ru/Bi | Acrylonitrile conversion (percent) | Dinitrile selectivity (percent) | 1,4-isomer selectivity (percent) | Propionitrile selectivity (percent) |
|---|---|---|---|---|---|
| 3 | 1/10 | 2.0 | 22 | 16.5 | 74 |
| 4 | 1/5 | 8.5 | 32 | 25.6 | 62 |
| 5 | 1/3 | 16.7 | 30 | 27.7 | 65 |
| 6 | 1/2 | 10.0 | 55 | 52.2 | 41 |
| 7 | 1/1 | 8.2 | 85 | 83.3 | 12 |
| 8 | 2/1 | 8.0 | 40 | 18.0 | 56 |
| 9 | 5/1 | 10.6 | 20 | 6.0 | 70 |

In all of Examples 3–9, more than 90% of the 1,4-isomers was 1,4-dicyanobuten-1, the rest being adiponitrile. Besides the foregoing, very minor amounts of decomposition products and polymers were detected.

EXAMPLE 10

Thirty (30) ml. of tetrahydrofuran solution containing $3\times10^{-4}$ mol of $Bi(C_6H_{11})_3$ were added to $1\times10^{-4}$ mol of $RuCl_3$, and further 5 g. of silica ($SiO_2$, surface area: 50 m.$^2$/g.; grain size: 1 mm. in diameter) were immersed therein. The silica immersed was then withdrawn, dried and placed in a tubular reactor, and maintained at 250° C. Through the reactor acrylonitrile vapor corresponding to 13.8 cc./hr. of liquid acrylonitrile and 5 liter/hr. of hydrogen gas were then passed under atmospheric pressure, and reacted. The acrylonitrile conversions at the end of first, second, and third hours from the initiation of reaction were 5.1%, 9.6%, and 11.7%, respectively. At the end of 7th hour the acrylonitrile conversion reached 15.1%, and the adiponitrile selectivity was 20%, 1,4-dicyanobuten-1 selectivity was 40%, and 2,4-dicyanobutene-1 selectivity was 5%.

EXAMPLE 11

0.9 gram of $RuCl_2[P(C_6H_5)_3]$ and 0.5 g. of $$Bi(C_6H_5)(n\text{-}C_4H_9)_2$$

were dissolved in tetrahydrofuran. Five (5) g. of alumina (surface area: 50 m.$^2$/g.; grain size: 2 mm. in diameter) were immersed in the solution and dried, followed by 2 hours hydrogen treatment at 250° C. The obtained catalyst system was placed in a tubular reactor, and through which vaporized acrylonitrile of the amount corresponding to 9.2 cc./hr. of liquid acrylonitrile and 3 liter/hr. of hydrogen gas were passed at 250° C., under atmospheric pressure. The resulting acrylonitrile conversion was 12.9%, 1,4-dicyanobuten-1 selectivity was 21%, adiponitrile selectivity was 20%, and 2,4-dicyanobuten-1 selectivity was 6%.

EXAMPLE 12

0.3 gram of metal bismuth was thoroughly mixed and ground with 10 g. of alumina (surface area: 70 m.$^2$/g.) in a mortar, and compression molded into columnar tablets of 3 mm. x 3 mm. $\phi$ in size. 0.4 gram of $RuCl_3$ was dissolved in 30 ml. of tetrahydrofuran, and into the solution the above molded mixture of bismuth and alumina was immersed to cause the impregnation of the latter with the former. The molded mixture immersed was withdrawn, dried, and treated in hydrogen current for 4 hours at 250° C., to reduce $RuCl_3$ on the alumina to metal ruthenium. Five (5) cc. of thus prepared catalyst was put in a tubular reactor of 15 mm. in inner diameter, and through which 1.5 liter (as the vapor) of acrylonitrile and 1 liter of hydrogen per hour were passed at 230° C. under atmospheric pressure. Acrylonitrile conversion was 6.1%, 1,4-dicyanobuten-1 selectivity was 31%, adiponitrile selectivity was 1.1%, and propionitrile selectivity was 57.0%.

EXAMPLE 13

0.15 gram of $RuCl_3$, 0.32 g. of $Bi(C_6H_5)_3$, and 0.025 g. of $PdCl_2$ (Ru:Bi:Pd=1:1:0.2 in mol ratio) were put in 50 ml. of tetrahydrofuran, and into the solution 5 g. of alumina (surface area: 200 m.$^2$/g.) were added. The system was heated on a steam bath to evaporate the tetrahydrofuran, and the remaining system was dried and treated in hydrogen current at 205° C. for 2 hours.

The prepared catalyst was maintained at 205° C., and vaporized acrylonitrile of an amount corresponding to 4.6 cc./hr. of liquid acrylonitrile, and 1 liter/hr. of hydrogen gas were passed thereover and reacted under atmospheric pressure.

The product collected in a bottle was analyzed. The resulting acrylonitrile conversion was 4.0%, 1,4-dicyanobuten-1 selectivity was 20.4%, adiponitrile selectivity was 0.4%, and propionitrile selectivity was 77%.

EXAMPLE 14

Example 13 was repeated except that the catalyst employed was binary system of $RuCl_3$—$Bi(C_6H_5)_3$, without using any $PdCl_2$. The resulting acrylonitrile conversion was 1.6%, 1.4-dicyanobuten-1 selectivity was 36.3%, adiponitrile selectivity was 0.5%, and propionitrile selectivity was 59%.

EXAMPLE 15

Example 13 was repeated except that the gaseous supply to the reaction zone consisted of vaporized acrylonitrile of an amount corresponding to 4.6 cc./hr. of liquid acrylonitrile, 0.3 liter/hr. of hydrogen gas, and 0.7 liter/hr. of nitrogen gas. The resulting acrylonitrile conversion was 3.8%, 1,4-dicyanobuten-1 selectivity was 46%, adiponitrile selectivity was 0.2%, and propionitrile seelctivity was 52% .

EXAMPLE 16

0.15 gram of ruthenium chloride, 0.06 g. of chloroauric acid ($HAuCl_4$), and 0.32 g. of triphenyl bismuth ($Bi(C_6H_5)_3$) were dispersed in 30 ml. of tetrahydrofuran, and 5 g. of alumina (surface area: 200 $m.^2/g.$) were added into the dispersion. Thus the catalyst components were carried on the alumina in such a manner that the solvent was evaporated from the system on a hot water bath of 70° C. The system was dried at 100° C., and treated with hydrogen for 2 hours at 200° C. On this catalyst vaporized acrylonitrile of an amount corresponding to 4.6 ml./hr. of liquid acrylonitrile, 0.2 liter/hr. of hydrogen, and 0.8 liter/hr. of nitrogen were passed at 200° C. under atmospheric pressure. The reaction product was collected in a bottle and analyzed by gas chromatography. The resulting acrylonitrile conversion was 3.2%, 1,4-dicyanobutene-1 selectivity was 71%, and propionitrile selectivity was 26%. Presence of adiponitrile was hardly recognizable.

EXAMPLE 17

0.15 gram of $RuCl_3$ and 0.255 g. of $Sb(C_6H_5)_3$ were partly dissolved and partly dispersed in 50 ml. of tetrahydrofuran, and into which 5 g. of alumina (surface area: 10 $m.^2/g.$; grain size: 2 mm. in diameter) were added. The catalytic components were thus carried on alumina in such a manner that the tetrahydrofuran was driven out from the system. Subsequently dried catalyst was treated with hydrogen at 200° C. for 2 hours, and immediately thereafter vaporized acrylonitrile of the amount corresponding to 4.6 cc./hr. of liquid acrylonitrile, 1 liter/hr. of hydrogen, and 0.2 liter/hr. of nitrogen were passed on the catalyst at 200° C. under atmospheric pressure. The resulting acrylonitrile conversion was 13.9%, 1,4-dicyanobuten-1 selectivity was 3.4%, and propionitrile selectivity was 96.6%. Presence of adiponitrile was hardly recognizable.

EXAMPLE 18

0.15 gram of $RuCl_3$ and 0.3 g. of $Sb(C_{10}H_7)_3$ were dissolved and partly dispersed in 50 ml. of anhydrous ethanol, and 5 g. of alumina (surface area, 25 $m.^2/g$; grain size, 2 mm. in diameter) were added thereto. The catalyst components were deposited on the alumina in such a manner that the ethanol was driven out from the system, and the system was dried, followed by 2 hours hydrogen treatment at 230° C. Thus prepared catalyst system was placed in a tubular reactor, and vaporized acrylonitrile of an amount corresponding to 4.6 ml./hr. of liquid acrylonitrile and 1 liter/hr. of hydrogen were passed therethrough at 230° C. under atmospheric pressure. The resulting acrylonitrile conversion was 13.3%, and the selectivity for 1,4-dicyanobuten-1 was 6%. Presence of adiponitrile was not appreciably recognizable.

EXAMPLE 19

0.15 gram of RuCl and 0.3 g. of $As(C_6H_5)_3$ were dissolved and partly dispersed in 40 ml. of tetrahydrofuran, and 5 g. of alumina (surface area: 100 $m.^2/g.$) were added thereto. The catalyst components were deposited on the alumina in such a manner that the tetrahydrofuran was driven out from the system and dried, followed by 2 hours' hydrogen treatment at 200° C. Then vaporized acrylonitrile of the amount corresponding to 4.6 ml./hr. of liquid acrylonitrile and 1 liter/hr. of hydrogen were passed on the catalyst at 210° C. under atmospheric pressure. The resulting acrylonitrile conversion was 0.7%. 1.4-dicyanobuten-1 selectivity was 94.8%, adiponitrile selectivity was 1.1% and propionitrile selectivity was 4%.

EXAMPLE 20

0.15 gram of $RuCl_3$, 0.07 g. of $HAuCl_4$, and 0.3 g. of $As(C_6H_5)_3$ were dissolved and partly dispersed in 40 ml. of tetrahydrofuran. As the carrier, 5 g. of alumina (surface area, 100 $m.^2/g.$) were added thereto and the catalyst components were deposited on the alumina in such a manner that the tetrahydrofuran was driven out from the system. After drying, the catalyst was treated with hydrogen for 2 hours at 200° C.

Vaporized acrylonitrile of an amount corresponding to 4.6 ml./hr. of liquid acrylonitrile and 1 liter/hr. of hydrogen were passed on this catalyst at 200° C., under atmospheric pressure. The resulting acrylonitrile conversion was 1%, 1,4-dicyanobuten-1 selectivity was 98%, adiponitrile selectivity was 0.9%, and propionitrile selectivity was 1%.

EXAMPLE 21

0.45 gram of $RuCl_3 \cdot H_2O$ and 1.33 g. of $P(C_6H_5)_3$ were dissolved in ethanol and refluxed for 2 hours on a steam bath. Then the ethanol was driven out, and the system evaporated to dryness was washed with benzene to remove free $P(C_6H_5)_3$ unreacted with $RuCl_3$ and diphenyl formed, and again dissolved in ethanol by heating. To the solution 15 g. of spherical alumina calcined at 1,000° C. ("Neobead" alumina produced by Mizusawa Kagaku Kogyo K.K, calcined at 1,000° C., surface area, 50 $m.^2/g.$; grain size, 2 mm. in diameter) were added, and the ethanol was driven out from the system.

Ten (10) ml. of the catalyst were put in a tubular reactor of 15 mm. in inner diameter, and the inside temperature was raised while nitrogen ($N_2$) was passed therethrough. At 150° C., vaporized acrylonitrile of an amount corresponding to 4.5 ml./hr. of liquid acrylonitrile and 1 liter/hr. of hydrogen ($H_2$) were passed through the reactor, and the reaction temperature was raised to 180° C. The reaction was performed under atmospheric pressure.

The reaction product was analyzed by gas chromatography carrying diethylene glycol adipate polyester, at elevated temperatures of 120–220° C. The resulting acrylonitrile conversion was 2%, selectivity for cis and trans-1,4-dicyanobuten-1 was 83.7%, and that for adiponitrile was 1.3%. The selectivity for propionitrile was 13%.

EXAMPLE 22

0.45 gram of $RuCl_3 \cdot 3H_2O$ and 1.85 g. $P(C_6H_5)_2(C_{10}H_7)$ were dissolved in ethanol, and refluxed for 3 hours on a steam bath. Thereafter ethanol was driven out, and the system evaporated to dryness was washed with toluene to remove free $P(C_6H_5)_2(C_{10}H_7)$ unreacted with $RuCl_3$ and diphenyl, naphthalene, etc., formed during the refluxing. The remaining system was again dissolved in ethanol, and 15 g. of alumina powder calcined at 800° C. (surface area: 50 $m.^2/g.$) added thereto, and the ethanol was driven out by evaporation. The catalyst system thus obtained was then shaped into columnar tablets of 2 mm. in diameter and 1 mm. in height, using a tabletting machine.

Five (5) ml. of this catalyst were put in a similar tubular reactor to that used in Example 17, and after heating the inside thereof while passing nitrogen therethrough, vaporized acrylonitrile of the amount corresponding to 4.5 ml./hr. of liquid acrylonitrile and 3 liter/hr. of hydrogen gas were supplied under atmospheric pressure at 150° C. The acrylonitrile conversion was 1.5%, the selectivity for cis- and trans-1,4-dicyanobuten-1 was 88.4%, and that for adiponitrile was 1.6%. Also the selectivity for propionitrile was 8%. Besides the foregoing, presence of very minor amounts of 1,3-dicyanobuten-1 and 1,3-dicyanobutene was recognized.

We claim:

1. A process for the preparation of dimers of acrylonitrile selected from adiponitrile, 1,4-dicyanobutene-2, 1,4-dicyanobutene-1 and mixtures thereof, which comprises contacting acrylonitrile with hydrogen in the vapor phase at a molar ratio of hydrogen to acrylonitrile of 1:0.1–10, at a temperature within the range of from 100 to 450° C., under a total absolute pressure ranging from 1–20 atmospheres, said temperature and pressure maintaining the reaction totally in the vapor phase, in the presence of a catalyst consisting essentially of (A) a member selected from
- (i) ruthenium metal;
- (ii) inorganic ruthenium compounds; and
- (iii) organic ruthenium compounds and complex compounds; and (B) a member selected from
- (i) bismuth metal;
- (ii) inorganic bismuth compounds;
- (iii) compounds of the formula:

$$Bi(R_1R_2R_3)$$

wherein $R_1$, $R_2$, and $R_3$ are the same or different hydrocarbon groups;
- (iv) compounds of the formula:

$$Sb(R_1'R_2'R_3')$$

wherein $R_1'$, $R_2'$, and $R_3'$ are the same or different hydrocarbon groups;
- (v) elementary arsenic;
- (vi) inorganic arsenic compounds;
- (vii) compounds of the formula:

$$As(R_1''R_2''R_3'')$$

wherein $R_1''$, $R_2''$, and $R_3''$ are the same or different hydrocarbon or oxygen-containing hydrocarbon groups; and
- (viii) compounds of the formula:

$$P(R_1'''R_2'''R_3''')$$

wherein $R_1'''$, $R_2'''$, and $R_3'''$, are the same or different hydrocarbon groups, the molar ratio of (A) to (B) being 1:0.5–10.

2. The process of claim 1, in which the catalyst is supported on an inert carrier having a surface area of 10–200 m.²/g.

3. The process of claim 2, wherein said catalyst supported on the carrier is pretreated with hydrogen at a temperature ranging from room temperature up to 500° C.

4. The process of claim 1, wherein the reaction temperature is within the range of from 150 to 350° C.

5. The process of claim 1 wherein the total pressure is within the range of from 1 to 3 atmospheres.

6. The process of claim 1, wherein the acrylonitrile is contacted with hydrogen gas diluted with an inert gas.

7. The process of claim 2 wherein (B) is a compound of the formula $M(R_1R_2R_3)$ wherein M is an element selected from the group consisting of bismuth, antimony, arsenic, and phosphorus, and $R_1$, $R_2$, and $R_3$ are same or different hydrocarbon groups.

8. The process of claim 7, wherein (B) is a compound of the formula $Bi(R_1R_2R_3)$ wherein $R_1$, $R_2$, and $R_3$ are same or different hydrocarbon groups.

9. The process of claim 8, wherein (B) is $Bi(C_6H_5)_3$.

10. The process of claim 1 wherein component (A) is a member selected from
- (i) ruthenium metal;
- (ii) inorganic ruthenium compounds selected from ruthenium chlorides, ruthenium hydroxide, ruthenium nitrate, ammonium hexachlororuthenate and ruthenium oxychloride;
- (iii) ruthenium acetate;
- (iv) ruthenium triacetylacetonate; and
- (v) ruthenium complex compounds selected from $Ru(OCOCH_3)_2P(C_6H_5)_3$; $RuCl_2(CH_2{=}CHCN)_4$; $RuCl_2[P(C_6H_5)_3]_3$; $RuCl_2[As(C_6H_5)_3]_2(CH_3OH)$; and $RuCl_2[Sb(C_6H_5)_3]_4$.

11. The process of claim 1 wherein said catalyst further includes (C) a member selected from
- (i) palladium metal
- (ii) $PdCl_2$,
- (iii) $Pd(C_6H_5)_4$,
- (iv) $PdCl_2[P(C_6H_5)_3]_2$,
- (v) $Pd(NO_3)_2$,
- (vi) $PdBr_2$,
- (vii) $Pd(OCCH_3)_2$,
- (viii) gold metal
- (ix) inorganic salts of gold
- (x) organic carboxylates of gold
- (xi) organo gold compounds containing electron donor groups.

said compound (C) being present in an amount of 0.1-mole per mole of ruthenium.

12. The process of claim 11, wherein said catalyst is a ternary catalyst system composed of $RuCl_3$, $Bi(C_6H_5)_3$ and $PdCl_2$.

13. A process for the preparation of dimers of acrylonitrile selected from adiponitrile, 1,4-dicyanobutene-2, 1,4-dicyanobutene-1 and mixtures thereof, which comprises contacting acrylonitrile with hydrogen in the vapor phase at a molar ratio of hydrogen to acrylonitrile of 1:0.1–10, at a temperature within the range of from 100 to 450° C., under a total absolute pressure ranging from 1–20 atmospheres, said temperature and pressure maintaining the reaction totally in the vapor phase, in the presence of a catalyst consisting essentially of (A) a member selected from
- (i) ruthenium metal;
- (ii) inorganic ruthenium compounds; and
- (iii) organic ruthenium compounds and complex compounds; and (B) a member selected from
- (i) bismuth metal;
- (ii) inorganic bismuth compounds selected from bismuth halides, bismuth nitrate and bismuth oxychloride;
- (iii) compounds of the formula:

$$Bi(R_1R_2R_3)$$

wherein $R_1$, $R_2$, and $R_3$ are the same or different and are selected from alkyl, aryl and cycloalkyl groups;
- (iv) compounds of the formula:

$$Sb(R_1'R_2'R_3')$$

wherein $R_1'$, $R_2'$, and $R_3'$ are the same or different and are selected from alkyl, aryl and cycloalkyl groups;
- (v) elementary arsenic;
- (vi) arsenic chloride;
- (vii) compounds of the formula:

$$As(R_1''R_2''R_3'')$$

wherein $R_1''$, $R_2''$, and $R_3''$ are the same or different and are selected from alkyl, aryl, cycloalkyl, alkoxy and aryloxy groups; and
- (viii) compounds of the formula:

$$P(R_1'''R_2'''R_3''')$$

wherein $R_1'''$, $R_2'''$, and $R_3'''$ are the same or different and are selected from alkyl, aryl and cycloalkyl groups, the molar ratio of (A) to (B) being 1:0.5–10.

14. The process of claim 13 wherein component (A) is a member selected from (i) ruthenium metal;
(ii) inorganic ruthenium compounds selected from ruthenium chlorides, ruthenium hydroxide, ruthenium nitrate, ammonium hexachlororuthenate and ruthenium oxychloride;
(iii) ruthenium acetate;
(iv) ruthenium triacetylacetonate; and
(v) ruthenium complex compounds selected from $Ru(OCOCH_3)_2P(C_6H_5)_3$; $RuCl_2(CH_2{=}CHCN)_4$; $RuCl_2[P(C_6H_5)_3]_3$; $RuCl_2[As(C_6H_5)_3]_2(CH_3OH)$; and $RuCl_2[Sb(C_6H_5)_3]_4$ 15. A process for the preparation of dimers of acrylonitrile selected from adiponitrile, 1,4-dicyanobutene-2,1,4-dicyanobutene-1 and mixtures thereof, which comprises contacting acrylonitrile with hydrogen in the vapor phase at a molar ratio of hydrogen to acrylonitrile of 1:0.1–10, at a temperature within the range of from 100 to 450° C., said temperature and pressure maintaining the reaction totally in the vapor phase, in the presence of a catalyst consisting essentially of (A) a member selected from
  (i) ruthenium metal;
  (ii) inorganic ruthenium compounds; and
  (iii) organic ruthenium compounds and complex compounds; and
(B) a member selected from
  (i) bismuth metal;
  (ii) inorganic bismuth compounds selected from bismuth halides, bismuth nitrate and bismuth oxychloride;
  (iii) compounds of the formula:

$$Bi(R_1R_2R_3)$$

wherein $R_1$, $R_2$, and $R_3$ are the same or different and are selected from lower alkyl, phenyl and cyclohexyl groups;
  (iv) compounds of the formula:

$$Sb(R_1'R_2'R_3')$$

wherein $R_1'$, $R_2'$, and $R_{32}$ are the same or different and are selected from lower alkyl, phenyl, naphthyl and cyclohexyl groups;
  (v) elementary arsenic;
  (vi) arsenic chloride;
  (vii) compounds of the formula:

$$As(R_1''R_2''R_3'')$$

wherein $R_1''$, $R_2''$, and $R_3''$ are the same or different and are selected from lower alkyl, phenyl, naphthyl, cyclohexyl, lower alkoxy and phenoxy groups; and
  (viii) compounds of the formula:

$$P(R_1'''R_2'''R_3''')$$

wherein $R_1'''$, $R_2'''$, and $R_3'''$ are the same or different and are selected from lower alkyl, phenyl and cycloalkyl groups, the molar ratio of (A) to (B) being 1:0.5–10.

16. The process of claim 15 wherein component (A) is a member selected from (i) ruthenium metal;
(ii) inorganic ruthenium compounds selected from ruthenium chlorides, ruthenium hydroxide ruthenium nitrate, ammonium hexachlororuthenate and ruthenium oxychloride;
(iii) ruthenium acetate;
(iv) ruthenium triacetylacetonate; and
(v) ruthenium complex compounds selected from $Ru(OCOCH_3)_2P(C_6H_5)_3$; $Ru(OCOCH_3)_2P(C_6H_5)_3$; $RuCl_2(CH_2{=}CHCN)_4$; $RuCl_2[P(C_6H_5)_3]_3$; $RuCl_2[As(C_6H_5)_3]_2(CH_3OH)$; and $RuCl_2[Sb(C_6H_5)_3]_4$

References Cited

UNITED STATES PATENTS

| | | | |
|---|---|---|---|
| 3,560,561 | 2/1971 | Scheben et al. | 260—465.8 X |
| 3,450,730 | 6/1969 | Scheben et al. | 260—465.8 X |
| 3,449,387 | 6/1969 | Chabardes et al. | 260—465.8 X |
| 3,562,181 | 2/1971 | Linn et al. | 260—465.8 |
| 2,244,645 | 6/1941 | Jacobson | 260—465.8 |
| 3,484,475 | 12/1969 | Cornforth et al. | 260—465.8 |
| 3,538,133 | 11/1970 | Knoth, Jr. | 260—465.8 |

FOREIGN PATENTS

| | | | |
|---|---|---|---|
| 1,472,033 | 1/1967 | France | 260—465.8 |

JOSEPH P. BRUST, Primary Examiner

U.S. Cl. X.R.

260—465.1